United States Patent
Hefele et al.

(10) Patent No.: US 9,878,345 B2
(45) Date of Patent: Jan. 30, 2018

(54) SQUEEZE-OUT DISPENSER

(75) Inventors: Christian Hefele, Breitenbrunn (DE);
Hans Peter Lederle, Durach (DE);
Franz Heiberger, Stettfurt (CH)

(73) Assignee: Hilti Aktiengesellschaft, Schaan (LI)

( * ) Notice: Subject to any disclaimer, the term of this patent is extended or adjusted under 35 U.S.C. 154(b) by 1026 days.

(21) Appl. No.: 12/613,311

(22) Filed: Nov. 5, 2009

(65) Prior Publication Data
US 2010/0116851 A1    May 13, 2010

(30) Foreign Application Priority Data
Nov. 7, 2008  (DE) .................. 10 2008 043 538

(51) Int. Cl.
| | | |
|---|---|---|
| *B05C 17/01* | (2006.01) | |
| *B05C 17/005* | (2006.01) | |
| *F16N 3/12* | (2006.01) | |
| *B65D 83/00* | (2006.01) | |

(52) U.S. Cl.
CPC .... *B05C 17/0103* (2013.01); *B05C 17/00576* (2013.01); *B65D 83/005* (2013.01); *F16N 3/12* (2013.01)

(58) Field of Classification Search
CPC .......... B05C 17/0103; B05C 17/00576; B65D 83/005; F16N 3/12
USPC ............ 222/101–103, 325–327, 386–386.5, 222/391–392; 74/29–30, 109, 132, 135, 74/422, 89.12, 89.17
See application file for complete search history.

(56) References Cited

U.S. PATENT DOCUMENTS

| | | | | |
|---|---|---|---|---|
| 654,868   | A | * | 7/1900  | Ballinger ........................ 74/109 |
| 679,983   | A | * | 8/1901  | O'Neil ....................... 425/376.1 |
| 975,660   | A | * | 11/1910 | Waggoner et al. ........... 211/166 |
| 1,700,364 | A | * | 1/1929  | Bishop et al. ................ 222/102 |
| 2,093,387 | A |   | 9/1937  | Tear |
| 2,240,046 | A | * | 4/1941  | Marra ........................... 222/391 |
| 3,747,806 | A | * | 7/1973  | Goings ......................... 222/102 |
| 3,916,957 | A | * | 11/1975 | Dewas ............................ 74/109 |
| 3,938,474 | A | * | 2/1976  | Goings ......................... 222/102 |
| 4,318,499 | A |   | 3/1982  | Hamilton |
| 4,397,199 | A | * | 8/1983  | Jahn ............................... 74/422 |
| 4,850,648 | A | * | 7/1989  | Muller ............................ 299/43 |
| 5,150,631 | A | * | 9/1992  | Faerber et al. ................. 74/422 |
| 5,419,460 | A | * | 5/1995  | Herold et al. ................ 222/105 |
| 5,421,663 | A | * | 6/1995  | Bravo ............................. 401/82 |
| 5,582,067 | A | * | 12/1996 | Snider ............................ 74/109 |

(Continued)

FOREIGN PATENT DOCUMENTS

| | | |
|---|---|---|
| CH | 248 156 A    | 4/1947 |
| DE | 22 27 930 A1 | 8/1973 |

(Continued)

*Primary Examiner* — Paul R Durand
*Assistant Examiner* — Andrew P Bainbridge
(74) *Attorney, Agent, or Firm* — Crowell & Moring LLP

(57) ABSTRACT

A squeeze-out dispenser for a container containing compounds is disclosed. In an embodiment, the squeeze-out dispenser features two plungers which are provided with a profile along their longitudinal extensions and a drive unit for the plungers with a drive meshing with the profile of the plungers. The profile of the plungers is formed by several through-holes spaced apart from one another at a uniform interval and passing through the plungers, into which through-holes engagements of the drive engage for advancing the plungers.

8 Claims, 1 Drawing Sheet

(56) References Cited

U.S. PATENT DOCUMENTS

| | | | |
|---|---|---|---|
| 5,735,437 A * | 4/1998 | Broyles et al. | 222/137 |
| 6,837,642 B1 * | 1/2005 | Lin | 403/109.1 |
| 6,938,799 B1 * | 9/2005 | Berntsen et al. | 222/137 |
| 2002/0056329 A1 * | 5/2002 | Rasmussen | 74/89.17 |

FOREIGN PATENT DOCUMENTS

| | | |
|---|---|---|
| DE | 203 09 471 U1 | 2/2004 |
| FR | 918 076 A | 1/1947 |
| JP | 2001 317214 A | 11/2001 |

\* cited by examiner

SQUEEZE-OUT DISPENSER

This application claims the priority of German Patent Document No. 10 2008 043 538.4, filed Nov. 7, 2008, the disclosure of which is expressly incorporated by reference herein.

BACKGROUND AND SUMMARY OF THE INVENTION

The invention relates to a squeeze-out dispenser for containers containing compounds having at least one plunger, which has a profile along its longitudinal extension, and having a drive unit for the at least one plunger with a drive meshing with the profile of the at least one plunger.

This type of squeeze-out dispenser is used for applying compounds packaged in containers, such as, for example, foil pouches or cartridges, to an application location. This squeeze-out dispenser is suitable for applying different types of compounds, such as, for example, grout or sealing compounds. By actuating the manual or electrical drive device, the drive means is activated and the at least one plunger is advanced by a predetermined measurement, wherein a pressure plate arranged on the plunger acts on the container and applies a corresponding quantity of the compound contained therein through a dispensing opening of the squeeze-out dispenser. In order to replace a squeezed-out container, the plunger must be retracted so that the container inserted into the squeeze-out dispenser can be removed from the dispenser and be replaced by another container.

A squeeze-out dispenser with a plunger, which has a tooth profile along its longitudinal extension, and with a drive unit for the at least one plunger is known from German Patent Document No. DE 22 27 930 A1. The drive unit comprises a motor and a gear mechanism as a drive as well as a gear wheel driven by the drive and meshing with the tooth profile of the at least one plunger as the drive means. Changing the pole of the motor is used to retract the plunger, which was previously advanced by the drive unit, into its initial position, where the inserted container can be removed and a new container can be inserted into the squeeze-out dispenser. This type of squeeze-out dispenser is designated as a toothed rack dispenser and guarantees that the plunger is advanced continuously.

What is disadvantageous in the known solution is that a plunger with a tooth profile is expensive to manufacture and prone to getting dirty because impurities such as dust, compound, or the like can get deposited on the tooth profile and thereby interfere with the meshing of the gear wheel acting as the drive means.

The objective of the invention is creating a generic squeeze-out dispenser, which does not have the aforementioned disadvantages, wherein, in particular, the at least one plunger can be manufactured cost-effectively.

According to the invention, the profile of the at least one plunger is formed by several through-holes spaced apart from one another at a uniform interval and passing through the plunger, into which through-holes engagements of the drive engage for advancing the at least one plunger.

Any impurities that may get deposited in the through-holes are ejected by passing through the continuous through-holes during the meshing of the drive with the at least one plunger. The engagements of the drive of the drive device engage on the flanks of the through-holes that lie in the advancement direction and guarantee continuous advancement of the at least one plunger. In doing so, the at least one plunger can be displaced by the drive device both in the advancement direction as well as against it.

The at least one perforated plunger can be manufactured simply, for example, by precision blanking, which makes it possible to form the through-holes on the at least one plunger in a highly precise manner as well as without burrs.

The drive is preferably at least one gear wheel, wherein the teeth of the at least one gear wheel are the engagements. The at least one gear wheel meshes with the through-holes in the at least one plunger for the advancement of the at least one plunger, thereby guaranteeing continuous advancement of the at least one plunger during the entire squeeze-out process. In addition, any impurities located in the through-holes are ejected in a simple manner by the teeth penetrating the through-holes.

Alternatively, the drive comprises, for example, a lever mechanism with a lever, which when actuated, a free end of the lever as an engagement penetrates the through-holes or meshes with them to advance the at least one plunger.

The teeth of the at least one gear wheel preferably have an involute contour, which guarantees advantageous meshing with the at least one plunger and therewith advantageous advancement of the same during the entire squeezing-out process.

The through-holes in the opening cross-section are preferably rectangular and in particular advantageously approximately square, thereby producing a symmetrical structure over the corresponding longitudinal extension of the at least one perforated plunger and preventing hardening distortion along the same.

At least the lateral edge of each through-hole is preferably provided with a chamfer, which lateral edge is facing away from the advancement direction of the at least one plunger and is facing the meshing drive. The chamfer, which is embodied for example as a bevel or as a rounding, guarantees a flawless meshing of the drive with the at least one plunger, in particular when the drive is comprised of a gear wheel meshing with the at least one plunger. The chamfer also strengthens the at least one perforated plunger. In addition, the tooth flank load is controlled in an advantageous manner. Because of the chamfer, each through-hole of the at least one perforated plunger is expanded in sections with respect to its opening cross-section on the side of the at least one plunger facing the drive at least against the advancement direction, which makes simple meshing of the drive with the at least one perforated plunger possible.

At least two opposing lateral edges of each through-hole, which are facing each other in the longitudinal extension or in the advancement direction of the at least one plunger and are facing the meshing drive, are each provided with a chamfer. The opposing chamfers, which are embodied, for example, as a bevel or as a rounding, guarantee flawless meshing of the drive with the at least one plunger. This is guaranteed in particular when the drive is comprised of a gear wheel meshing with the at least one plunger. The chamfers also strengthen the at least one perforated plunger. In addition, the tooth flank loads are controlled in a more advantageous manner. Because of the opposing chamfers, each through-hole of the at least one perforated plunger is expanded in sections with respect to its opening cross-section on the side of the at least one plunger facing the drive as well as against the advancement direction, which makes a still simple meshing of the drive with the at least one perforated plunger possible.

The invention is explained in greater detail in the following on the basis of an exemplary embodiment.

DETAILED DESCRIPTION OF THE DRAWINGS

Figure 1:
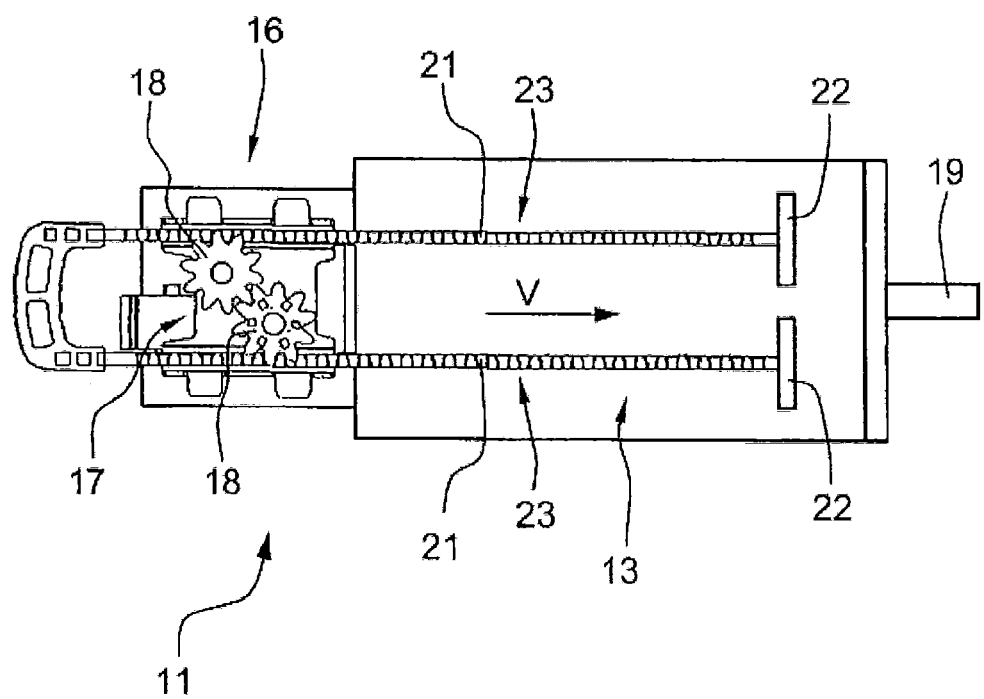
FIG. 1 is a top view of an embodiment of a squeeze-out dispenser.
Figure 2:
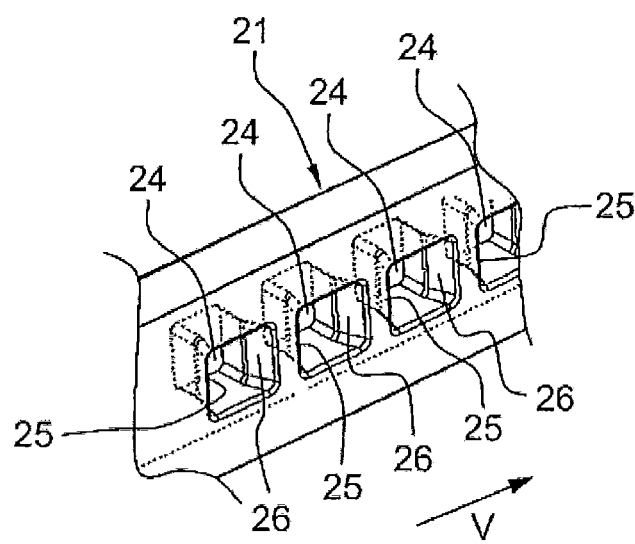
FIG. 2 is a perspective representation of a section of a plunger.

An embodiment of a squeeze-out dispenser 11 is depicted in FIGS. 1 and 2 and is used to squeeze a compound out of a container, which is arranged replaceably in a receiving area 13 of the squeeze-out dispenser 11. The squeeze-out dispenser 11 has two plungers 21, each of which has a pressure plate 22 on its free end for squeezing out the compound located in the container. Along the longitudinal extension of each of the plungers 21 is a profile 23, which is formed by several through-holes 24 spaced apart from one another at a uniform interval and passing through the plunger 21.

In addition, the squeeze-out dispenser 11 has a drive unit 16 for the plungers 21, which comprises, for example, an electric motor, a transmission and two gear wheels 18 as the drive 17, which are driven by the motor and mesh with one another and with the through-holes 24 of the plungers 21. When the motor is actuated, the gear wheels 18 are put into rotation and they mesh with their teeth, and additionally, the teeth comprise engagements that engage with the through-holes of the perforated plungers 21 so that both plungers 21 are displaced by the gear wheels 18 in order to squeeze out the compound. The compound output from the container in the process is dispensed from the dispensing opening 19 of the squeeze-out dispenser 11.

The teeth of the two gear wheels 18 respectively have an involute contour. For example, by reversing the polarity of the electric motor or by any other method of reversing the rotation of the gear wheels, the gear wheels 18 are rotated against the rotational direction that advances the plungers 21 so that the plungers 21 can be retracted into an initial position in order to change the container.

Alternatively, a manually operable lever mechanism is the drive and a free end of the lever is the engagement which meshes with at least one of the perforated plungers for advancing the same.

As FIG. 2 makes evident, the through-holes 24, in the opening cross-section are rectangular. The lateral edges 25 and 26 of each through-hole 24, which are facing each other in the longitudinal extension or in the advancement direction V of the plungers 21 and are facing the drive 17, are each provided with a chamfer. As a result, the through-holes 24 are expanded in the longitudinal extension of the plungers 21 with respect to the approximately square opening cross-section in the direction of the longitudinal extension of the plungers 21, each on the side of the plungers 21 facing the drive 17.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A squeeze-out dispenser for containers containing compounds, comprising:
   a plunger which has a push rod along a longitudinal extension that selectively pushes a piston, wherein the push rod includes through-holes spaced apart from one another at a uniform interval along substantially an entire length of the push rod, and wherein the push rod is movable over the entire length of the push rod only in a single dimension; and
   a drive, wherein the drive includes an engagement;
   wherein the engagement of the drive engages with at least several of the through-holes of the push rod for selectively advancing the plunger.

2. The squeeze-out dispenser according to claim 1, wherein the drive includes a gear wheel and wherein a tooth of the gear wheel is the engagement.

3. The squeeze-out dispenser according to claim 2, wherein the tooth of the gear wheel has an involute contour.

4. The squeeze-out dispenser according to claim 1, wherein the through-holes, in an opening cross-section, are rectangular.

5. The squeeze-out dispenser according to claim 1, wherein a lateral edge of each through-hole includes a chamfer, wherein the lateral edge faces away from an advancement direction of the plunger and faces the drive.

6. The squeeze-out dispenser according to claim 1, wherein at least two opposing lateral edges of each through-hole, which at least two opposing lateral edges face each other in the longitudinal extension of the plunger and face the drive, each include a chamfer.

7. The squeeze-out dispenser according to claim 1, wherein the drive is a manually operable lever and wherein a free end of the lever is the engagement.

8. A squeeze-out dispenser for containers containing compounds, comprising:
   a plunger which has a push rod along a longitudinal extension that selectively pushes a piston, wherein the push rod includes through-holes spaced apart from one another at a uniform interval along substantially an entire length of the push rod, and wherein the push rod is movable over the entire length of the push rod only in a single dimension; and
   a means for driving the plunger, wherein the means for driving the plunger engages with at least several of the through-holes of the push rod for selectively advancing the plunger.

* * * * *